United States Patent
Hoffmann et al.

(10) Patent No.: US 11,718,012 B2
(45) Date of Patent: Aug. 8, 2023

(54) POLYAMIDE MOULDING COMPOSITION FOR EXTRUSION BLOW MOULDING

(71) Applicant: EMS-PATENT AG, Domat/Ems (CH)

(72) Inventors: Botho Hoffmann, Domat/Ems (CH); Oliver Thomas, Volketswil (CH); Minoru Hatta, Tokyo (JP); Takamasa Fujii, Tokyo (JP)

(73) Assignee: EMS-PATENT AG, Domat/Ems (CH)

( * ) Notice: Subject to any disclaimer, the term of this patent is extended or adjusted under 35 U.S.C. 154(b) by 668 days.

(21) Appl. No.: 16/719,284

(22) Filed: Dec. 18, 2019

(65) Prior Publication Data

US 2020/0198211 A1  Jun. 25, 2020

(30) Foreign Application Priority Data

Dec. 19, 2018 (EP) .................... 18214076

(51) Int. Cl.
| | | |
|---|---|---|
| C08L 23/08 | (2006.01) | |
| C08L 51/00 | (2006.01) | |
| C08L 71/02 | (2006.01) | |
| C08L 77/06 | (2006.01) | |
| C08L 77/12 | (2006.01) | |
| B29C 49/00 | (2006.01) | |
| C08K 3/014 | (2018.01) | |
| B29C 45/00 | (2006.01) | |
| B29C 49/04 | (2006.01) | |
| C08K 5/00 | (2006.01) | |
| B29K 23/00 | (2006.01) | |
| B29L 31/30 | (2006.01) | |

(52) U.S. Cl.
CPC ...... B29C 49/0005 (2013.01); B29C 45/0001 (2013.01); B29C 49/04 (2013.01); C08K 3/014 (2018.01); C08K 5/005 (2013.01); C08L 23/0815 (2013.01); C08L 51/006 (2013.01); C08L 71/02 (2013.01); C08L 77/06 (2013.01); C08L 77/12 (2013.01); B29K 2023/08 (2013.01); B29K 2877/00 (2013.01); B29L 2031/30 (2013.01); C08L 2203/18 (2013.01); C08L 2203/30 (2013.01)

(58) Field of Classification Search
CPC .......... C08L 2205/02; C08L 2205/025; C08L 2205/03
See application file for complete search history.

(56) References Cited

U.S. PATENT DOCUMENTS

2013/0172484 A1   7/2013  Zhang et al.
2016/0280915 A1*  9/2016  Blondel ................. C08L 51/06

FOREIGN PATENT DOCUMENTS

| DE | 197 45 701 A1 | 4/1999 |
|---|---|---|
| DE | 10 2008 044 224 A1 | 6/2010 |
| EP | 1 482 011 A1 | 12/2004 |
| EP | 1 518 901 A2 | 3/2005 |
| EP | 1 841 824 | 10/2007 |
| EP | 1 884 356 A1 | 2/2008 |
| EP | 2 325 260 A1 | 5/2011 |
| EP | 2 687 554 A1 | 1/2014 |
| EP | 3 126 447 | 2/2017 |
| JP | 2014526591 A * | 10/2014 |

OTHER PUBLICATIONS

JP 2014526591 A, machine translation (Oct. 2014).*
European Search Report for EP18214076 dated Jun. 12, 2019.

* cited by examiner

Primary Examiner — Ana L. Woodward
(74) Attorney, Agent, or Firm — Sughrue Mion, PLLC

(57) ABSTRACT

Thermoplastic moulding composition consisting of
(A) 51 to 69.9 wt % of polyamide elastomer;
(B) 15 to 38 wt % of ethylene-α-olefin copolymer;
(C) 3 to 25 wt % of polyamide selected from the group consisting of: PA6, PA66, PA6/66, PA610, PA612, PA614, PA616, PA6/610, PA66/610 or mixtures thereof;
(D) 0.1 to 2.0 wt % of heat stabilizers based on copper and/or iodide, organic stabilizers or a mixture thereof;
(E) 0 to 5.0 wt % of additives, different from (A) to (D); where the sum of (A) to (E) makes 100 wt % of the total moulding composition, and with the proviso that the sum of (B) and (C) is in the range from 30 to 48 wt % based on the total moulding composition.

35 Claims, No Drawings

POLYAMIDE MOULDING COMPOSITION FOR EXTRUSION BLOW MOULDING

TECHNICAL FIELD

The present invention relates to a polyamide moulding composition suitable for the blow moulding process, and also to processes for producing such polyamide moulding compositions, articles produced from such polyamide moulding compositions, and uses of such moulding compositions.

PRIOR ART

Motor vehicle construction often makes use of tubes and hoses made from polyamide moulding compositions, since polyamides in general have a good profile of mechanical, thermal and chemical resistance properties.

Thus, for example, EP-A-2 325 260 describes a polyamide moulding composition for producing various line systems in the automotive sector, based on semiaromatic thermoplastic polyamides.

For the production of air-carrying parts, it is general practice to employ extrusion blow moulding, which through variants such as 3D blow moulding or suction blow moulding allows the production of complicated geometries in a manner which is economic and minimizes waste. The moulding compositions described, for example, in EP-A-2 325 260 are unsuitable for extrusion blow moulding, because of their excessively high melt strength and in particular because of the poor surface of the resultant component. Furthermore, the moulding compositions described have too high a stiffness, denying access to flexible tubes, especially those equipped with high-flexibility bellows. Only polyamide moulding compositions within a defined range of melt strength and of elasticity modulus are suitable for such uses.

If the melt strength is too low, a vertically extruded parison of polyamide tends generally to lengthen rapidly and drip away and/or tear off under its own weight. If the melt strength is too high, on the other hand, either the shaping of a hose is not possible, or the attainable surface quality is insufficient.

The moulding compositions described in EP-A-2 687 554, based on polyamide 6, are indeed blow-mouldable, but possess too high a stiffness, and so flexible lines cannot be produced.

EP-A-1 884 356 describes a multilayer composition in the form of a hollow profile, more particularly a fuel line, comprising a thermoplastic outer layer and at least one further layer, where the outer layer is formed of a mixture based on 80 to 20 parts by weight of at least one polyamide and 20 to 80 parts by weight of at least one polyamide elastomer. The addition of polyamide elastomer is intended to increase the elongation at break (referred to therein as tear strength). The outer layer preferably comprises polyamide 12, a polyamide-6-etheramide and, as compatibilizer, an impact modifier. Under alternating compressive and tensile shearing load and also simultaneous heat exposure, however, such systems suffer delamination.

US-A-20130172484 claims an elastomer mixture comprising a polyetheresteramide, an aliphatic polyamide and two different ethylene copolymers. The elastomer mixture is said to have improved resistance to wear, and improved resilience. Applications are, in particular, injection-moulded articles in the sports segment, especially footwear soles. The moulding compositions have a melt strength which is too low for extrusion blow moulding. EP-B-3 126 447 likewise relates to a moulding composition for producing sports articles, especially ski boots or football boots. Besides the main component, formed by a semicrystalline polyamide, the moulding composition comprises a polyamide elastomer and also further optional components. The polyamides employed are exclusively polyamides of the PA11, PA12 and PA1010 type and also polyetheresteramides based on PA11 and PA12.

EP-A-1 482 011 relates to a thermoplastic moulding composition which comprises a mixture of a thermoplastic polyamide resin as main component and a polyamide elastomer, where the polyamide elastomer contains at least 50 wt % of a polyetherimide elastomer produced by polymerizing a triblock polyetherdiamine compound with a polyamide-forming monomer. As a result of the triblock polyetherdiamine, the moulding composition possesses improved stability towards hydrolysis. The examples employ mixtures of PA12 and various PA12 triblock polyether elastomers comprising 70 and 80 wt % of PA12.

DE-A-10 2008 044 224 discloses a moulding composition which comprises at least 50 wt % of a mixture of a polyamide and a polyamide elastomer selected from the group of polyetheresteramide and polyetheramide. The moulding composition is used for producing mouldings for contact with a supercritical medium, preferably for producing an internal thermoplastic layer in a hose or pipe in which a supercritical medium is conveyed.

EXPOSITION OF THE INVENTION

An object of the present invention, therefore, among others, was to provide a polyamide moulding composition which is blow-mouldable, possesses high flexibility and good calcium chloride resistance, and exhibits very good heat distortion resistance and a high resistance under dynamic-mechanical stressing, especially with simultaneous heat exposure.

In particular an object of the present invention was to make available a blow-mouldable polyamide moulding composition having the following features, individually or, preferably, in combination:

blow mouldable: melt strength (MST) of preferably in the range from 30 to 70 seconds, more preferably in the range of 35 and 60 seconds, more particularly of 40 to 55 seconds, determined in each case according to the method described in the experimental section;

high flexibility: tensile elasticity modulus of preferably at most 800 MPa (ISO 527 (2012), dry state), more preferably in the range of 100 and 700 MPa, more particularly from 200 to 600 MPa;

high thermal ageing resistance: breaking stress and elongation at break (ISO 527 (2012), dry state) after storage in air at 150° C. after 1000 hours are preferably still at least 50% of the original values;

resistance under dynamic-mechanical stress: no delamination after preferably 1.3 million cycles with alternating compressive and tensile loading at 150° C. (according to test as described in the experimental section—dynamic tension-elongation test);

calcium chloride resistance: after 20 cycles, preferably no cracks and no reduction in the breaking stress and the elongation at break (according to test as described in the experimental section).

The invention therefore relates to a polyamide moulding composition which is blow-mouldable, exhibits high flexibility, exhibits very good thermal ageing resistance, and exhibits improved resistance to delamination under dynamic-mechanical stress. The invention further relates to mouldings produced from the moulding composition, more particularly flexible tubes or hoses which are produced by extrusion blow moulding and which on the basis of their advantageous properties can be used as lines, more particularly as lines for air systems in motor vehicles.

The present invention relates specifically to a thermoplastic moulding composition consisting of
(A) 51 to 69.9 wt % of polyamide elastomer,
  selected from the group consisting of: polyetheramide, polyetheresteramide, or a mixture thereof,
  having hard segments selected from the group consisting of: PA6, PA66, PA6/66, PA610, PA612, PA614, PA616 or a combination thereof, and
  having soft segments in the form of OH- or $NH_2$-functionalized polyether segments;
(B) 15 to 38 wt % of ethylene-α-olefin copolymer,
  where the 60-olefin is selected from the group consisting of: but-1-ene, pent-1-ene, hex-1-ene, hept-1-ene and oct-1-ene or a combination thereof,
  and the ethylene-α-olefin copolymer is grafted with at least one system selected from the group consisting of: acrylic acid, methacrylic acid, maleic anhydride, where the degree of grafting is 0.8 to 2.0 wt % based on the grafted ethylene-α-olefin copolymer;
(C) 3 to 25 wt % of polyamide selected from the group consisting of: PA6, PA66, PA6/66, PA610, PA612, PA614, PA616, PA6/610, PA66/610 or mixtures thereof;
(D) 0.1 to 2.0 wt % of heat stabilizers based on copper and/or iodide, lanthanoid compounds, organic stabilizers or a mixture thereof;
(E) 0 to 5.0 wt % of additives, different from (A) to (D);
where the sum of (A) to (E) makes 100 wt % of the total moulding composition.

The composition is additionally subject to the proviso that the sum of (B) and (C) is in the range from 30 to 48 wt % based on the total moulding composition. Preferably the sum of (B) and (C) is in the range of 32-45 wt %, more preferably in the range of 35-42 wt % and especially preferably in the range of 36-41 wt %.

A moulding composition of this kind is able to provide the positive properties described above, especially blow mouldability, high flexibility and good calcium chloride resistance, and also a good heat distortion resistance and a high resistance under dynamic-mechanical stress, especially with simultaneous thermal loading.

With regard to component (A), the moulding composition according to a first preferred embodiment is characterized in that the fraction of component (A) in the total moulding composition is in the range of 52-67.8 wt %, preferably in the range of 53-64.6 wt %, especially preferably in the range of 56-63.5 wt %.

The soft segments of the polyamide elastomer of component (A) are preferably selected from the group consisting of: polypropylene glycol, polytetrahydrofuran, or a combination thereof.

The hard segments of the polyamide elastomer of component (A) are preferably selected from the group consisting of: PA6, PA66, PA6/66 or a combination thereof. Especially preferably the hard segments are formed exclusively by PA6.

The polyamide elastomer of component (A) or the mixture of polyamide elastomers of component (A) preferably possesses a melting point in the range of 180-250° C., preferably in the range of 200-220° C. Alternatively or additionally it possesses a relative viscosity, measured at a concentration of 0.5 g of polymer in 100 ml of m-cresol and a temperature of 20° C., in the range from 1.40 to 2.40, preferably in the range of 1.50-2.20. The polyamide elastomer (A) is preferably a polyamideetheramide (also referred to as polyetheramide), polyamideetheresteramide (also referred to as polyetheresteramide) with hard segments based on PA6, PA66 or PA610 and soft segments based on polypropylene glycol or polytetramethylene glycol and carrying OH or $NH_2$ end groups. The end groups may also be present in mixed form.

The production of polyetheramides and polyetheresteramides may take place here by cocondensation of polyamide blocks such as PA 6 or PA 66, for example, which have carboxyl groups on both chain ends, with polyether blocks which are based on polyalkylene oxide polyols and which have amino groups or hydroxyl groups at both chain ends.

Preferred for component (A) are polyamide elastomers from the subgroups of the polyetheramides, the polyetheresteramides, including the block copolyetheresteretheramides. These copolymers are prepared from polyether blocks having reactive end groups suitable for forming ester bonds and/or amide bonds, preference being given to hydroxyl and/or amino end groups. The polyether backbone may consist of polypropylene glycol (PPG), polytetramethyl glycol (PTMEG), polybutylene glycol (PBG), polyethylene glycol (PEG), polyneopentyl glycol (PNPG) and/or mixtures thereof and/or copolymers thereof and/or block polymers thereof.

In the case of the polyetherdiol and/or the polyetherdiamine, the polyether unit may be based, for example, on 1,2-ethanediol, 1,2-propanediol, 1,3-propanediol, 1,4-butanediol or 1,3-butanediol. The polyether unit may also be of mixed construction, for instance with statistical or blockwise distribution of the units originating from the diols. The number-average molar mass of the polyetherdiols and/or polyetherdiamines is 200 to 5000 g/mol and preferably 400 to 3000 g/mol; the fraction thereof in the polyetheresteramide and/or polyetheramide is preferably 5 to 60 wt % and more preferably 20 to 50 wt %. Suitable polyetherdiamines are accessible by conversion of the corresponding polyetherdiols through reductive amination or coupling onto acrylonitrile with subsequent hydrogenation; they are available commercially, for example, in the form of the JEFFAMIN® D or ED products or of the ELASTAMINE® products, in the case of Huntsman Corp., or in the form of the Polyetheramine D series in the case of BASF SE. In minor amounts it is also possible to use a polyethertriamine as well, such as a JEFFAMIN® T product, for example. With regard to component (B), the moulding composition according to a further preferred embodiment is characterized in that the fraction of component (B) in the total moulding composition is in the range of 18-36 wt %, preferably in the range of 20-33 wt % or in the range of 25-33 wt %.

Preferably the total ethylene-α-olefin copolymer of component (B) is grafted exclusively with maleic anhydride.

The degree of grafting of the ethylene-α-olefin copolymer of component (B) is preferably in the range of 0.9-1.6 wt %, preferably in the range of 1.0-1.4 wt %.

Component (B) consists preferably exclusively of an ethylene-1-butene copolymer which is grafted with maleic anhydride with a degree of grafting in the range of 1.1-1.3 wt %, based on the grafted ethylene-1-butene copolymer.

It is preferred, furthermore, if ethylene-α-olefin copolymer of component (B) or the mixture of ethylene-α-olefin copolymers of component (B) has a melting point in the range of 40-80° C., preferably in the range of 60-70° C., and/or has a glass transition point of less than −20° C., preferably of less than −30° C., and/or has a melt flow index (MFR) in the range of 0.5-5.0 g/10 min, preferably in the range of 0.8-2.0 g/10 min or in the range of 1.0-1.5 g/10 min, in each case at 230° C. and 2.16 kg as measured according to ASTM D 1238.

Component (B) therefore comprises copolymers of ethylene (ethene) and at least one α-olefin, where the α-olefin is selected from the group consisting of but-1-ene, pent-1-ene, hex-1-ene, hept-1-ene and oct-1-ene, where but-1-ene is particularly preferred. The fraction of α-olefin in the copolymer (B) is preferably 25 to 60 wt %, especially preferably 28 to 55 wt %. The ethylene-α-olefin copolymers are grafted with 0.8 to 2.0 wt %, preferably 0.9 to 1.6 wt %, of acrylic acid, methacrylic acid or maleic anhydride, with this quantity figure being based on the grafted ethylene-α-olefin copolymer. Particular preference is given to an ethylene-butylene copolymer which is grafted with maleic anhydride and where the amount of maleic anhydride is in the range from 0.9 to 1.6 wt %.

The moulding composition is in particular free, as claimed, from ethylene-propylene copolymers; in particular such systems occur neither as a constituent of component (B) nor as a part of other components.

With regard to component (C), the moulding composition according to a further preferred embodiment is characterized in that the fraction of component (C) in the total moulding composition is in the range of 5-22 wt %, preferably in the range of 7-18 wt % or in the range of 8-15 wt %.

The polyamide of component (C) is preferably selected from the group consisting of: PA6, PA66, PA6/66, PA610, PA612, PA614, PA616, especially selected from the group consisting of: PA6, PA66, PA6/66.

According to one particularly preferred embodiment, component (C) is exclusively formed by PA6.

The polyamide of component (C) preferably possesses a relative viscosity ($\eta_{rel}$) of 3.2-4.2 or 3.4-4.2 (1.0 wt % in sulfuric acid, 20° C., ISO 307 (2013)), preferably in the range of 3.5-4.1 or 3.6-4.0.

It is quite specifically preferred if the polyamide of component (C) comprises PA6 or consists exclusively of PA6, this PA6 having a relative viscosity of 3.4-4.2 (1.0 wt % in sulfuric acid, 20° C., ISO 307 (2013)), preferably in the range of 3.5-4.1.

Component (C) is therefore an aliphatic polyamide preferably selected from the group consisting of PA6, PA66, PA6/66, PA610, PA6/610, PA66/610 or mixtures thereof. Preference is given to using polyamides PA6 and PA6/66, particular preference to using PA6.

So that the melt strength is within the correct range for the extrusion blow moulding process, polyamides (C) used are preferably those having a relative viscosity of 3.2 to 4.2 (sulfuric acid, 1%), more preferably 3.5 to 4.1. Particular preference is given to polyamide 6 having a relative viscosity of 3.5 to 4.1.

With regard to component (D), the moulding composition according to a further preferred embodiment is characterized in that the fraction of component (D) in the total moulding composition is in the range of 0.2-2.0 wt %, preferably in the range of 0.25-2.0 wt % or 0.3-2.0 wt % and especially preferably in the range from 0.3 to 1.5 wt %.

The heat stabilizers of component (D) comprise systems or consist preferably of systems selected from the group consisting of: copper(I) iodide, potassium iodide, organic stabilizers, or a mixture thereof, where preferably the organic stabilizers are selected from the group consisting of: phenols, especially preferably in the form of pentaerythritol tetrakis(3-(3,5-di-tert-butyl-4-hydroxyphenyl)propionate), tetrakismethylene(3,5-di-t-butyl-4-hydroxyhydrocinnamato)methane or a mixture of these systems.

The heat stabilizers of component (D) comprise or are exclusively formed preferably by a mixture of copper(I) iodide, potassium iodide, where preferably the fraction of copper(I) iodide is in the range of 0.02-0.1 wt % and the fraction of potassium iodide is in the range of 0.2-0.6 wt %, based in each case on the total moulding composition.

The heat stabilizers of component (D) comprise or are exclusively formed preferably by a mixture of pentaerythritol tetrakis(3-(3,5-di-tert-butyl-4-hydroxyphenyl)propionate) and tetrakismethylene(3,5-di-t-butyl-4-hydroxyhydrocinnamato)methane, preferably in a weight ratio of 1:1-3:1, preferably in the range of 2:1-8:3 or in the range of 7:3.

The heat stabilizers of component (D) comprise or are exclusively formed preferably of systems selected from the group consisting of: copper(I) iodide, potassium iodide, lanthanum acetate, lanthanum hydroxide, lanthanum oxide, cerium acetate, cerium tetrahydroxide and cerium oxide, or mixtures thereof.

The moulding composition of the invention therefore comprises heat stabilizers (D) (or, synonymously, thermal stabilizers) in a concentration of preferably 0.2 to 2 wt %, more preferably from 0.30 to 1.50 wt %.

In one preferred embodiment, the heat stabilizers are selected from the group consisting of
- compounds of mono- or divalent copper, e.g. salts of mono- or divalent copper with inorganic or organic acids or with mono- or dihydric phenols, the oxides of mono- or divalent copper, or the complex compounds of copper salts with ammonia, with amines, with amides, with lactams, with cyanides or with phosphines, preferably Cu(I) or Cu(II) salts of the hydrohalic acids or the hydrocyanic acids, or the copper salts of the aliphatic carboxylic acids. Particularly preferred are the monovalent copper compounds CuCl, CuBr, CuI, CuCN and Cu2O, and also the divalent copper compounds $CuCl_2$, $CuSO_4$, CuO, copper(II) acetate or copper(II) stearate. Where a copper compound is used, the amount of copper is preferably 0.02 to 0.5, more particularly 0.03 to 0.35 and very preferably 0.05 to 0.25 wt %, based on the sum of the other components, i.e. based on the total polyamide moulding composition.

The copper compounds are per se available commercially and/or their preparation is known to the skilled person. The copper compound may be used as such or in the form of concentrates. A concentrate in this context is understood to be a polymer, preferably of the same chemical nature as the polyamides (A) or (B), which comprises the copper salt in a high concentration. The use of concentrates is a customary process and is employed particularly frequently when very small amounts of an ingredient need metering. The copper compounds are used advantageously in combination with further metal halides, especially alkali metal halides, such as NaI, KI, NaBr, KBr, where the molar ratio of metal halide to copper halide is 0.5 to 20, preferably 1 to 10 and more preferably 3 to 8.
- Compounds of the lanthanoids selected from the group consisting of fluorides, chlorides, bromides, iodides, oxyhalides, sulfates, nitrates, phosphates, chromates, perchlorates, carboxylates of mono- and dicarboxylic acids having 1 to 20 carbon atoms, especially acetates, formates, propionates and oxalates, the monochalcogenides of sulfur, selenium and tellurium, carbonates, hydroxides, oxides, trifluoromethanesulfonates, acetylacetonates, alkoxides, 2-ethylhexanoates of the lanthanoids lanthanum, cerium, praseodymium, neodymium, promethium, samarium, europium, gadolinium, terbium, dysprosium, holmium, erbium, thulium, ytterbium and lutetium, and also hydrates of the stated salts, and also mixtures of the stated compounds. Particularly preferred compounds are those of lanthanum and cerium, where with particular preference lanthanum acetate, lanthanum hydroxide, lanthanum oxide, cerium acetate, cerium tetrahydroxide and cerium oxide are used.

Stabilizers based on secondary aromatic amines, where these stabilizers are present preferably in an amount of 0.2 to 2.0, more preferably of 0.2 to 1.5 wt %, stabilizers based on sterically hindered phenols, where these stabilizers are present preferably in an amount of 0.1 to 1.5, more preferably of 0.2 to 1.0 wt %, and phosphites and phosphonites, and also mixtures of the above-stated stabilizers.

Particularly preferred examples of stabilizers based on secondary aromatic amines and employable in accordance with the invention are adducts of phenylenediamine with acetone (Naugard A), adducts of phenylenediamine with linolene, Naugard 445, N,N'-dinaphthyl-p-phenylenediamine, N-phenyl-N'-cyclohexyl-p-phenylenediamine or mixtures of two or more thereof.

Preferred examples of stabilizers based on sterically hindered phenols and employable in accordance with the invention are N,N'-hexamethylenebis-3-(3,5-di-tert-butyl-4-hydroxyphenyl)propionamide, glycol bis(3,3-bis(4'-hydroxy-3'-tert-butylphenyl)-butanoate), 2,1'-thioethylbis(3-(3,5-di-tert-butyl-4-hydroxyphenyl)propionate), 4,4'-butylidenebis (3-methyl-6-tert-butylphenol), triethylene glycol-3-(3-tert-butyl-4-hydroxy-5-methylphenyl)propionate or mixtures of two or more of these stabilizers.

Preferred phosphites and phosphonites are triphenyl phosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl) pentaerythritol diphosphite, diisodecyloxy pentaerythritol diphosphite, bis(2,4-di-tert-butyl-6-methylphenyl) pentaerythritol diphosphite, bis(2,4,6-tris(tert-butylphenyl)) pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenzo[d,g]-1,3,2-dioxa-phosphocine, 6-fluoro-2,4,8,10-tetra-tert-butyl-12-methyldibenzo[d,g]-1,3,2-dioxaphosphocine, bis(2,4-di-tert-butyl-6-methylphenyl) methyl phosphite and bis(2,4-di-tert-butyl-6-methylphenyl) ethyl phosphite. Preferred in particular are tris[2-tert-butyl-4-thio(2'-methyl-4'-hydroxy-5'-tert-butyl)phenyl-5-methyl] phenyl phosphite and tris(2,4-di-tert-butylphenyl) phosphite.

Preference is given to using, for example, a heat stabilization exclusively based on CuI and KI, in which case preferably 0.2-0.6 wt % of potassium iodide and 0.02 to 0.10 wt % of copper(I) iodide are used. As well as the addition of copper or of copper compounds, it is additionally possible to use further transition metal compounds, especially metal salts or metal oxides of group VB, VIB, VIIB or VIIIB of the periodic table. Furthermore, the moulding composition of the invention is admixed preferably with transition metals of group VB, VIB, VIIB or VIIIB of the periodic table, such as iron powders or steel powders, for example. Particularly preferred is a combination of inorganic and organic stabilization, more particularly based on CuI and KI and also Irganox 1010 and Anox 20, in which case more particularly 0.2-0.6 wt % of potassium iodide and 0.02 to 0.10 wt % of copper(I) iodide and also 0.5 to 1.5 wt % of Irganox 1010 or of a mixture of Irganox 1010 and Anox 20 (7:3) are used.

Generally speaking, therefore, according to another preferred embodiment, component (D), which is present in the moulding composition in a fraction in the range from 0.2 to 2 wt %, preferably in the range from 0.30 to 1.50 wt %, is a system selected from the following group: compounds of mono- or divalent copper, stabilizers based on secondary aromatic amines, stabilizers based on sterically hindered phenols, phosphites, phosphonites, and mixtures thereof.

Preferred organic stabilizers are phenol compounds and/or phosphite compounds, such as, for example, Irganox 245, Irganox 1010, Irganox 1098, Hostanox PAR 24, Anox 20 or Irgafos 168. Particularly preferred is Irganox 1010 in a concentration of 0.5 to 1.0 wt %, especially in combination with 0.2 to 0.4 wt % of Anox 20.

With regard to component (E), the moulding composition according to a further preferred embodiment is characterized in that the fraction of component (E) in the total moulding composition is in the range of 0-4.0 wt %, preferably in the range of 0.1-3.0 wt % or in the range of 0.2-2.5 wt %.

The additives of component (E) are systems preferably selected from the following group: crystallization accelerators or retardants, flow aids, lubricants, demoulding agents, pigments, dye and marking substances, processing aids, antistats, carbon black, graphite, carbon nanotubes, residues from polymerization processes such as catalysts, salts and derivatives thereof, antioxidants, antiozonants, light stabilizers, UV stabilizers, UV absorbers or UV blockers, IR absorbers, NIR absorbers, antiblocking agents, nucleating agents, chain transfer agents, defoamers, chain-extending additives, conductivity additives, release agents, organic pigments, carbon black, graphite, graphene, photochromic agents, demoulding agents, optical brighteners, and also mixtures and combinations thereof.

The additives of component (E) are preferably systems selected from the following group: demoulding aids, light stabilizers, pigments, dyes, chain extenders. The latter preferably take the form of acrylic acid-modified polyolefins having a degree of grafting of more than 4 wt % and/or combination of a polycarbonate with an acid-terminated polyamide, where chemically modified polyolefins are especially selected as polyethylene grafted with acrylic acid, preferably with a degree of grafting in the range of 5-7 wt %, based on the grafted polyethylene, where the polyethylene is preferably an HDPE.

The mixture of the polyamide moulding composition therefore optionally also comprises, in the form of component (E), further auxiliaries and/or additives, different from the other components (A) to (D), in a fraction of at most 5.0 wt %.

According to one preferred embodiment, component (E) is present in a fraction, based on the total polyamide moulding composition, in the 0.1-4.0 wt % range, especially preferably in the range of 0.5-3.5 wt %.

Preferred as component (E) are, as stated, chain-extending additives (chain extenders), leading in the case of thermoplastic processing to an increase in molecular weight through chain extension of polyamide, polyetheramide or polyetheresteramide molecules. Preferred chain extenders are acrylic acid-modified polyethylenes with a degree of grafting of more than 4 wt %, and also the combination of a polycarbonate with an acid-terminated polyamide.

One such chain extender is available commercially, for example, under the name Bruggolen® M 1251 from Brüggemann Chemical (Deutschland), and comprises a masterbatch composed of a low-viscosity polycarbonate in an acid-terminated polyamide 6.

Another preferred variant of a chain extender is an acrylic acid-modified polyethylene of high density, preferably with a degree of grafting in the range from 4.5% to 7%, available, for example, from Chemtura under the trade name Polybond® 1009, grafted with 6 wt % of acrylic acid.

Further preferred chain extenders are aromatic polycarbodiimides, which are sold, for example, by Rhein-Chemie (Deutschland) under the Stabaxol® P name. Other preferred chain extenders are acrylic acid-modified linear polyethylenes of low density, such as, for example, the Okabest® 2400 sold by OKA-Tec. Further preferred chain extenders are 1,1'-carbonylbiscaprolactamates, which are sold, for example, by DSM under the name Allinco® CBC, and also bisoxazolines, such as 1,4-phenylenebis(2-oxazoline), for example.

The chain extenders of the present invention are used at 0.5 to 2.5 weight percent, preferably at 0.7 to 2.2 weight percent and more preferably at 1 to 2 weight percent, based on 100 weight percent of the polyamide moulding composition, which is composed of the above-described components (A) to (E).

In one preferred embodiment the thermoplastic moulding composition consists of
(A) 52 to 67.8 wt % of polyamide elastomer,
  selected from the group consisting of: polyetheramide, polyetheresteramide, or a mixture thereof,
  having hard segments selected from the group consisting of: PA6, PA66, PA6/66, PA610, PA612, PA616 or a combination thereof, and
  having soft segments in the form of OH- or $NH_2$-functionalized polyether segments polypropylene glycol (PPG) and polytetrahydrofuran (PTHF);
(B) 18 to 36 wt % of ethylene-α-olefin copolymer,
  where the α-olefin is selected from the group consisting of: but-1-ene and oct-1-ene or a combination thereof, and the ethylene-α-olefin copolymer is grafted with maleic anhydride,
  where the degree of grafting is 0.9 to 1.6 wt % based on the grafted ethylene-α-olefin copolymer;
(C) 5 to 22 wt % of polyamide, selected from the group consisting of: PA6, PA66, PA6/66, PA610, PA612, PA616 or mixtures thereof;
(D) 0.2 to 2.0 wt % of heat stabilizers based on copper and/or iodide, lanthanoid compounds, organic stabilizers or a mixture thereof;
(E) 0 to 4.0 wt % of additives, different from (A) to (D); where the sum of (A) to (E) makes 100 wt % of the total moulding composition.

The composition is additionally subject to the proviso that the sum of (B) and (C) is in the range from 32 to 45 wt % based on the total moulding composition.

In another preferred embodiment the thermoplastic moulding composition consists of
(A) 53 to 64.6 wt % of polyamide elastomer,
  selected from the group consisting of: polyetheramide, polyetheresteramide, or a mixture thereof,
  having hard segments selected from the group consisting of: PA6, PA66, PA6/66 or a combination thereof, and
  having soft segments in the form of OH- or $NH_2$-functionalized polyether segments polypropylene glycol (PPG) and polytetrahydrofuran (PTHF);
(B) 20 to 33 wt % of ethylene-α-olefin copolymer,
  where the α-olefin is selected from the group consisting of: but-1-ene and oct-1-ene or a combination thereof, and the ethylene-α-olefin copolymer is grafted with maleic anhydride,
  where the degree of grafting is 0.9 to 1.6 wt % based on the grafted ethylene-α-olefin copolymer;
(C) 7 to 18 wt % of polyamide, selected from the group consisting of: PA6, PA66, PA6/66, PA610, PA612, PA616 or mixtures thereof;
(D) 0.3 to 2.0 wt % of heat stabilizers based on copper and/or iodide, lanthanoid compounds, organic stabilizers or a mixture thereof;
(E) 0.1 to 3.0 wt % of additives, different from (A) to (D); where the sum of (A) to (E) makes 100 wt % of the total moulding composition.

The composition is additionally subject to the proviso that the sum of (B) and (C) is in the range from 35 to 42 wt % based on the total moulding composition.

A moulding composition of the invention preferably possesses a melt strength in the range of 30-70 seconds or in the range of 35-60 seconds, preferably in the range of 40-55 seconds.

The moulding composition further preferably possesses a tensile elasticity modulus of at most 800 MPa (ISO 527 (2012), dry state), preferably in the range of 100-700 MPa, especially preferably in the range of 200-600 MPa.

The moulding composition preferably exhibits no delamination under dynamic-mechanical stressing after at least 1 million cycles, more particularly 1.3 million cycles, with alternating compressive and tensile loading at 150° C.

The present invention further relates to a process for producing a moulding composition as described above, said process being characterized in that components (A)-(E) in unison in optionally melted form are metered into a mixing apparatus, preferably in the form of an extrusion apparatus having preferably two or more screws.

The present invention likewise relates to the use of a moulding composition as described above in an injection moulding process, an extrusion process or a coextrusion process, preferably in a blow moulding process, preferably an extrusion blow moulding process or a stretch blow moulding process, including 3D blow moulding, coextrusion blow moulding, coextrusion 3D blow moulding, sequential coextrusion, coextrusion suction blow moulding, and sequential blow moulding, where preferably a preform produced by conventional injection moulding in a preceding operation is heated in a first process step, preferably with an infrared emitter, and, after the heating of the preform, it is run into a mould or heaters are run out of the mould and the closing of the mould produces, optionally, a longitudinal stretching on the bottleneck, thereby holding the preform axially, and then a gas is introduced into the preform and expands under the compressive stress and in so doing produces the mould contour.

The moulding compositions of the invention which are suitable for blow moulding can be processed by various processes such as, injection moulding, extrusion and coextrusion, for example. Preferred processing processes are extrusion blow moulding, 3D blow moulding, coextrusion blow moulding, coextrusion 3D blow moulding, sequential coextrusion and sequential blow moulding. Also possible, however, are injection moulding, injection moulding plus welding, thermoforming, coextrusion suction blow moulding, production of hard/soft composites, GIT (with internal gas pressure technology) and WIT (with internal water pressure technology) and comparable processing processes.

The polyamide moulding compositions of the invention are suitable, generally, for all applications requiring blow-mouldability, thermal ageing resistance, and a high resistance to alternating mechanical-dynamic load.

The present invention relates, moreover, to mouldings made from a moulding composition as described above, preferably in the form of a pipe or container, especially preferably in the form of a hollow body or a line, preferably for use in the automotive sector, including pipes or containers such as charge-air pipes for a motor vehicle, fluid-bearing monolayer or multilayer lines, which may be smooth or corrugated, such as fuel lines, hydraulic lines, brake lines, clutch lines or cooling-fluid lines, brake-fluid containers or fuel containers, where the moulding may additionally have further layers made from other thermoplastic materials, where preferably one such further layer consists of a system selected from the following group: PA 612, PA 610, PA 11, PA 12, PA 1010, PA 1012, PA 616, PA 6, PA 66, PA 10T/612, PA 9T/MT (M=2-methyloctane-1,8-diamine), PA 46, or mixtures thereof.

Single-layer or multilayer hollow bodies made from the moulding composition of the invention can be produced in principle by the extrusion blowing process or by special processes allocated to that process. The range of products produced in this case, as well as the usual hollow bodies in the packaging sector such as bottles, canisters, drums, etc., embraces a host of technical mouldings such as, for example, tubes and pipeline systems, which may be used for fluids such as gaseous media, for example. With the 3D processes (3D hose manipulation, 3D suction blowing processes) it is possible to produce any imaginable form of tubes and hoses for pressurized media and unpressurized media.

The polyamide moulding composition of the invention is blow-mouldable and at the processing temperature employed has a melt strength which is preferably in the range from 30 to 70 seconds, especially preferably in the range from 35 to 60 seconds and more preferably in the range from 40 to 55 seconds.

The preferred process for producing tube parts from a polyamide moulding composition of the invention is by subjecting a polyamide moulding composition with the constitution described to extrusion blow moulding.

With the process of extrusion blow moulding, preference is given to employing the variants of 3D blow moulding or suction blow moulding. A description of the extrusion blow moulding operation with all common variants, from conventional blow moulding via various 3D technologies through to sequential blow moulding and the coextrusion blow moulding, is found, for example, in the technical data sheet "Verarbeitung von Grilamid and Grilon durch Extrusionsblasformen" [Processing of Grilamid and Grilon by extrusion blow moulding] from EMS, from February 1998.

The preferred use of the moulding compositions of the invention, of mouldings produced from them or of a method for producing mouldings from such moulding compositions lies in their use for lines for air systems in motor vehicles. In the case of such use, the line for air systems is installed in particular in a petrol or diesel engine, more preferably in engines with exhaust gas turbochargers.

Polyamide moulding compositions of the invention may be used to form, for example, the clean air line, the charging-air feed tube and/or the charging-air return tube. The polyamide moulding composition of the invention or a line produced from it is also contemplated, however, for the crankshaft vent line or possibly even as an exhaust gas recirculation line in the region downstream of the exhaust gas recirculation cooler.

The air-carrying lines are normally of single-layer form. Alternatively, they could comprise one or more additional layers. Further layers may consist in principle of all polyamides which adhere to the moulding composition claimed, preference being given to PA616, PA 612, PA 610, PA 11, PA 12, PA 1010, PA 1012, PA 6, PA 66, PA 10T/612, PA 9T/MT (M=2-methyloctane-1,8-diamine) and PA 46.

Examples of mouldings of the invention are as follows: cooler tubes, cooler boxes, buffer containers and other media-carrying tubes and containers, air-carrying parts, which in particular may be used at relatively high temperature, such as tubes in turbochargers. Furthermore, the moulding composition of the invention may be used to produce single-layer or multilayer hollow bodies, such as tubes or containers, for example. Examples of these include charging-air tubes for a motor vehicle, fluid-carrying monolayer or multilayer lines, which may be smooth or corrugated, such as fuel lines, hydraulic lines, brake lines, clutch lines or cooling fluid lines, brake fluid containers or fuel containers, produced preferably by injection moulding, extrusion or blow moulding.

The mouldings in particular comprise fluid-carrying parts or lines (gases and/or liquids) or parts which in the course of their regular service come into contact with fluids, the fluid more particularly being water, glycol, oil, fuels (petrol, diesel), alcohols (e.g. methanol, ethanol, isopropanol), air or exhaust gases, or mixtures thereof. The moulded parts are preferably lines, bellows, ports, connectors or fittings and containers, which may also have been given antistatic treatment, for the automotive sector. Specific parts include smooth and corrugated tubes, tube sections, ports (intake, venting, filling and draining ports), fittings for connecting hoses, corrugated tubes and media-carrying lines, constituents of multilayer lines (outer layer, interlayer, inner layer), containers, parts of containers (e.g. closures), individual layers of multilayer containers, covers or crankcase parts, such as vents for crank cases, for example, in the automotive sector, hydraulic lines, brake lines, brake fluid containers, cooling fluid lines.

Further embodiments are specified in the dependent claims.

DESCRIPTION OF PREFERRED EMBODIMENTS

Preferred embodiments of the invention are described below by means of the working examples, which serve merely for illustration and should not be interpreted as imposing any limitation.

Production of the moulding compositions:

The moulding compositions identified in Tables 1 and 2 were produced on a ZSK25 twin-screw extruder from Werner and Pfleiderer at temperatures between 240 and 300° C., a screw speed of 200 rpm and a throughput of 10 kg/h. For this purpose, the ingredients listed were metered into the intake of the extruder. The melt was drawn off as a strand from a die 3 mm in diameter and was pelletized after water cooling. The pellets were dried for 24 hours at 80° C. under reduced pressure of 30 mbar.

Production of the test specimens:

The compounds were moulded using an Arburg Allrounder 320-210-750 injection moulding machine to form specimens at defined barrel temperatures of zones 1 to 4 of 240 to 280° C. and a moulding tool temperature of 100° C.

TABLE 1

| Inventive examples E1 to E5 | | | | | | |
|---|---|---|---|---|---|---|
| Components | Unit | E1 | E2 | E3 | E4 | E5 |
| PA6-Polyether block copolyamide | wt % | 58.6 | 58.6 | 57.6 | 56.6 | 58.6 |
| Tafmer MH5020C | wt % | 30.0 | | 30.0 | 30.0 | 20.0 |
| Tafmer MH7020 | wt % | | 30.0 | | | |
| PA6 | wt % | 10.0 | 10.0 | 10.0 | 10.0 | 20.0 |
| Potassium iodide | wt % | 0.35 | 0.35 | 0.35 | 0.35 | 0.35 |
| Copper(I) iodide | wt % | 0.05 | 0.05 | 0.05 | 0.05 | 0.05 |
| Irganox/Anox (7:3) | wt % | 1.00 | 1.00 | 1.00 | 1.00 | 1.00 |
| Euthylen black | wt % | 1.00 | 1.00 | 1.00 | 1.00 | 1.00 |
| Polybond 1009 | wt % | | | 1.00 | 2.00 | |
| Elasticity modulus | MPa | 230 | 260 | 230 | 230 | 550 |
| Breaking stress | MPa | 21 | 22 | 22 | 21 | 24 |
| Elongation at break | % | 240 | 230 | 250 | 220 | 200 |
| Thermal ageing resistance: retention BS/EB[1] | %/% | 65/60 | 62/58 | 68/60 | 70/55 | 72/65 |
| MST 240° C. | s | 45 | 47 | 51 | 59 | 51 |
| MST 260° C. | s | 43 | 43 | 48 | 57 | 47 |
| CaCl$_2$ resistance: cracking Retention BS/EB[1] | —  %/% | ++  100/100 | ++  100/100 | ++  100/100 | ++  100/100 | ++  100/100 |
| Dyn. tension-elongation test: Delamination after cycles | — | none[2] | none[2] | none[2] | none[2] | none[2] |

[1] BS = breaking stress, EB = elongation at break
[2] no delamination after 1.3 million cycles

TABLE 2

| Comparative Examples CE1 to CE6 | | | | | | | |
|---|---|---|---|---|---|---|---|
| Components | Unit | CE1 | CE2 | CE3 | CE4 | CE5 | CE6 [TB1] |
| PA6-Polyether block amide | wt % | 58.6 | 56.6 | 58.6 | 56.6 | | 39.5 |
| Pebax 5533 | wt % | | | | | 60.0 | |
| Tafmer MC201 | wt % | 30.0 | 30.0 | 20.0 | 20.0 | | |
| Fusabond N493 | wt % | | | | | 6.00 | |
| Exxelor VA1801 | wt % | | | | | 4.00 | 20.0 |
| PA6 | wt % | 10.0 | 10.0 | 20.0 | 20.0 | | |
| PA1010 | | | | | | 30.0 | |
| PA12 | wt % | | | | | | 39.5 |
| Potassium iodide | wt % | 0.35 | 0.35 | 0.35 | 0.35 | | |
| Copper iodide | wt % | 0.05 | 0.05 | 0.05 | 0.05 | | |
| Irganox/Anox | wt % | 1.00 | 1.00 | 1.00 | 1.00 | | 1.00 |
| Euthylen black | wt % | 1.00 | 1.00 | 1.00 | 1.00 | | |
| Polybond 1009 | wt % | | 2.00 | | 2.00 | | |
| Elasticity modulus | MPa | 250 | 250 | 570 | 560 | 840 | 880 |
| Braking stress | MPa | 21 | 21 | 25 | 25 | 26 | 26 |
| Elongation at break | % | 270 | 250 | 220 | 200 | 220 | 250 |
| Thermal ageing resistance: retention BS/EB[1] | %/% | 58/55 | 64/53 | 65/52 | 67/51 | 25/15 | 45/35 |
| MST 240° C. | S | 45 | 51 | 48 | 58 | 26 | 27 |
| MST 260° C. | S | 43 | 48 | 46 | 55 | 22 | 25 |
| CaCl$_2$ resistance: cracking Retention BS/EB[1] | —  %/% | ++  100/100 | ++  100/100 | +  95/90 | +  96/85 | +  90/85 | ++  95/90 |
| Dyn. tension-elongation test: Delamination after cycles | — | 30 000 | 32 000 | 23 000 | 26 000 | 17 000 | 22 000 |

[1] BS = breaking stress, EB = elongation at break

PA6-Polyether block amide:

Polyetheramide composed of PA6-dicarboxylic acid (76 wt %) and polypropylene glycol-diamine segments (24 wt %), melting point=210° C., relative viscosity=1.85, EMS-CHEMIE (CH)

Tafmer MH5020C:

Tafmer MI-15020C is an ethylene-1-butene copolymer with 50 wt % of but-1-ene, from Mitsui Chemicals (JP); 1.2 wt % of maleic anhydride; density 0.866 g/cm$^3$; MFR 1.2 g/10 min at 230° C. and 2.16 kg as measured according to ASTM D 1238.

Tafmer MH7020:

Tafmer MH7020 is an ethylene-1-butene copolymer with 30 wt % of but-1-ene, from Mitsui Chemicals (JP); 1.2 wt % of maleic anhydride; density 0.873 g/cm$^3$; MFR 1.5 g/10 min at 230° C. and 2.16 kg as measured according to ASTM D 1238.

Pebax 5533 SA 01:

Polyether-block-amide based on PA12 hard segments and polytetrahydrofuran ether segments, having a melting point of 155° C. and a Shore hardness of 54 (ISO 868), Arkema (FR)

Tafmer MC201:

Tafmer MC201 is a mixture of 67 wt % of ethylene-propylene copolymer (20 wt % of propylene) and 33 wt % of ethylene-but-1-ene copolymer (15 wt % of but-1-ene) grafted with 0.5 wt % of maleic anhydride, from Mitsui Chemicals (JP)

Fusabond N493:

Fusabond N493 is an ethene-oct-1-ene copolymer, grafted with maleic anhydride (0.5 wt %), MFR 1.6 g/10 min at 230° C. and 2.16 kg as measured according to ASTM D 1238, from DuPont (USA)

Exxelor VA1801:

Exxelor VA1801 is an ethene-propene copolymer grafted with 0.7 wt % of maleic anhydride, from ExxonMobil Chemicals (USA); density 0.88 g/cm$^3$; MFR 9.0 g/10 min at 230° C. and 10.0 kg as measured according to ISO 1133; Tg=−44° C.

PA6

Polycaprolactam with melting point of 222° C. and a relative viscosity of 3.6 (sulfuric acid, 1 wt %, 20° C., ISO 307 (2013)), EMS-CHEMIE (CH)

Potassium iodide:

KI from AJAY Europe S.A.R.L. (FR)

Copper(I) iodide:

CuI from William Blythe (UK)

Irganox/Anox:

Mixture of Irganox 1010 (CAS 6683-19-8, phenolic antioxidant from BASF) and Anox 20 (CAS 6683-19-8, phenolic antioxidant from Addivant) in a ratio of 7:3

Euthylen Black 00-6005 C4:

Pigmentary carbon black masterbatch based on polyethylene, with 40 wt % of pigmentary carbon black, BASF Color Solutions Polybond:

Polybond 1009 is an acrylic acid-grafted high-density polyethylene (AA-HDPE) from Addivant with a degree of grafting of 6.0 wt %; density 0.95 g/cm$^3$; MFR 5.0 g/10 min at 190° C. and 2.16 kg as measured according to ASTM D 1238; Tm=127° C.

The measurements were carried out according to the following standards and on the following test specimens:

Test specimens in the dry state, after injection moulding, are stored for at least 48 h at room temperature in a dry environment, i.e. over silica gel.

The thermal behaviour, the melting point (Tm), the enthalpy of fusion (ΔHm) and the glass transition temperature (Tg)—was determined on pellets using the ISO standard 11357-1, -2 and -3 (2013). The differential scanning calorimetry (DSC) was carried out with a heating rate of 20 K/min.

The relative viscosity ($\eta_{rel}$) of polyamide elastomers of component (A) was determined according to DIN EN ISO 307 (2013) on solutions of 0.5 g of polymer dissolved in 100 ml of m-cresol at a temperature of 20° C. The sample used was pellets.

The relative viscosity ($\eta_{rel}$) of polyamides of component (C) was determined according to DIN EN ISO 307 (2013) on solutions of 1.0 wt % of polymer dissolved in sulfuric acid (98%) at a temperature of 20° C. The sample used was pellets.

Tensile elasticity modulus, breaking stress and elongation at break: Tensile elasticity modulus, breaking stress and elongation at break were determined according to ISO 527 (2012) with a tensioning speed of 1 mm/min (tensile elasticity modulus) or with a tensioning speed of 50 mm/min (breaking stress, elongation at break) on an ISO tensile bar, standard ISO/CD 3167 (2014), type A1, 170×20/10×4 mm at 23° C. temperature in the dry state.

Determination of the melt strength (MST): The melt strength refers to the "stability" of the preform during extrusion blow moulding. As already mentioned above, suitable moulding compositions for extrusion blow moulding are only those whose melt strength lies within a certain range, i.e. within a suitable processing window. The applicant has developed an independent, practice-based method for assessing whether the melt strength is within the stated range. With this method, using a single-screw extruder (screw diameter=45 mm, L/D=25, Schwabenthan SM30U, Berlin), a parison is extruded continuously via an angled head. The measured variable is the time needed for the parison to travel the distance from the die to the floor. With the arrangement used, this distance is 100 cm. The melt strength measurement is operated with a constant ejection rate of 100 cubic centimetres of moulding composition melt per minute and with a temperature adapted to the type of polymer (see values in Tables 1 and 2). The time is measured starting from the moment when the parison, emerging continuously from an annular extrusion die, is tapped from the extrusion die with a spatula. The time is halted as soon as the newly emergent, downwardly migrating section of parison touches the floor (see FIG. 2 in EP1841824B1). The melt strength determined in this way is reported in seconds. A material which has a poor ability to bear its own increasing weight (as a result of the continually extruded melt), and which therefore begins to exhibit viscous elongation, will lengthen to a greater degree, and hence the tip of the parison will touch the floor earlier; in other words, the shorter measuring time corresponds to a lower melt strength. The practical advantage of this method for determining blow mouldability is that it is not based only on a single property viewed in isolation, such as the molecular weight of the polyamide or a viscosity, but instead that all further influencing variables relevant to the behaviour of the extruded parison preform are included automatically and integrally in the measured time. Determination of calcium chloride resistance: The calcium chloride resistance was determined using ISO tensile bars according to the standard ISO/CD 3167 (2014), type A1, 170×20/10×4 mm. The test was carried out in 20 cycles, and in each cycle the test specimens were stored for 2 hours at 80° C. and a relative humidity of 95%, and then were sprayed from both sides with a concentrated aqueous calcium chloride solution—the CaCl2 concentration was 74.5 g/100 ml of solution (simulation of the "salt mist" when driving a car in the winter), and stored in air at 100° C. for 5 hours.

After 5, 10, 15 and 20 cycles, the test specimens were examined visually with the aid of a microscope (5-10 times magnification) for cracking, and a tension-elongation test was carried out according to ISO 527 (2012) (in the dry state), with determinations of the breaking stress and of the elongation at break (5 specimens in each case were measured). Evaluation for cracking: ++: no cracking, +: a few small cracks, o: some large cracks, oo: numerous large cracks Dynamic tension-elongation test (delamination): The test specimens used were ISO 37 (2011) type 2 tensile bars, punched from injection-moulded plates with dimensions of 100×100×3 mm. The tensile bars were clamped into the temperature-conditionable tension-elongation apparatus Instron E3000 in such a way that the free test-specimen length between the two clamping devices was 45 mm (initial position). After the apparatus had been heated to 150° C., the tensile bar was periodically extended and then compressed again with a frequency of 10 Hz and a stroke of 9 mm, corresponding to a 20% elongation of the tensile bar. After 1.3 million cycles of this kind, the dynamic tension-elongation test is ended. A determination was made of the number of cycles after which initial signs of delamination occurred.

Thermal ageing resistance (TAR):

For the determination of the thermal ageing resistance, ISO tensile bars, standard ISO/CD 3167 (2014), type A1, 170×20/10×4 mm, were stored at 150° C. in a forced air oven (Binder FD115). After a storage time of 1000 hours, a tension-elongation test was performed on the dry tensile bars according to ISO 527 (2012) at 23° C. with a tensioning speed of 50 mm/min (5 test specimens each per moulding composition), and determinations were made of the breaking stress and the elongation at break. The tables above report the percentage retention of the breaking stress and elongation at break, respectively, after 1000 hours of storage, relative to the respective values prior to the thermal storage.

The invention claimed is:

1. A thermoplastic moulding composition consisting of:
   (A) 52-67.8 wt % of at least one polyamide elastomer, selected from the group consisting of: polyetheramide and polyetheresteramide,
   having hard segments selected from the group consisting of: PA6, PA66, PA6/66, PA610, PA612, and a combination thereof, and
   having soft segments in the form of OH- or $NH_2$-functionalized polyether segments;
   (B) 18-36 wt % of at least one ethylene-α-olefin copolymer,
   where the α-olefin is selected from the group consisting of: but-1-ene, pent-1-ene, hex-1-ene, kept-1-ene and oct-1-ene and a combination thereof,
   and the ethylene-α-olefin copolymer is grafted with at least one system selected from the group consisting of: acrylic acid, methacrylic acid, and maleic anhydride,
   where the degree of grafting is 0.9 to 2.0 wt % based on the grafted ethylene-α-olefin copolymer;
   (C) 5-22 wt % of at least one polyamide selected from the group consisting of: PA6, PA66, PA6/66, PA610, and PA612; wherein the polyamide of component (C) has a relative viscosity of 3.4-4.2, measured according to ISO 307 (2013), in sulfuric acid, 1.0 wt %, 20° C.;
   (D) 0.1 to 2.0 wt % of at least one of a heat stabilizer based on copper and/or iodide, lanthanoid compounds, or organic stabilizers;
   (E) 0 to 5.0 wt % of additives, different from (A) to (D); where the sum of (A) to (E) makes 100 wt % of the total moulding composition, and
   with the proviso that the sum of (B) and (C) is in the range from 32-45 wt % based on the total moulding composition.

2. The moulding composition according to claim 1, wherein the soft segments of the polyamide elastomer of component (A) are selected from the group consisting of: polypropylene glycol (PPG), polytetrahydrofuran (PTHF), and a combination thereof; and/or
   wherein the hard segments of the polyamide elastomer of component (A) are selected from the group consisting of: PA6, PA66, PA6/66 and a combination thereof; and/or
   wherein the polyamide elastomer of component (A) or the mixture of polyamide elastomers of component (A) has a melting point, measured according to ISO 11357-3 (2013) at a heating rate of 20° C./min, in the range of 180-250° C., and/or a relative viscosity, measured according to ISO 307 (2013) at a concentration of 0.5 g of polymer in 100 ml of m-cresol and a temperature of 20° C., in the range from 1.40 to 2.40; and/or
   wherein the number-average molar mass of the soft segments is 200 to 5000 g/mol.

3. The moulding composition according to claim 1, wherein the total ethylene-α-olefin copolymer of component (B) is grafted exclusively with maleic anhydride; and/or
   wherein component (B) consists exclusively of an ethylene-1-butene copolymer which is grafted with maleic anhydride with a degree of grafting in the range of 1.1-1.3 wt %, based on the grafted ethylene-1-butene copolymer; and/or
   wherein the ethylene-α-olefin copolymer of component (B) or the mixture of the ethylene-α-olefin copolymers of component (B) has a melting point in the range of 40-80° C., and/or a glass transition point of less than −20° C., and/or a melt flow index (MFR) in the range of 0.5-5.0 g/10 min or 0.8-2.0 g/10 min, at 230° C. and 2.16 kg as measured according to ASTM D 1238.

4. The moulding composition according to claim 1, wherein the fraction of component (D) in the total moulding composition is in the range of 0.2-2.0 wt %.

5. The moulding composition according to claim 1, wherein the heat stabilizers of component (D) comprise systems or consist of systems selected from the group consisting of: copper(I) iodide, potassium iodide, organic stabilizers, and a mixture thereof; and/or
   wherein the heat stabilizers of component (D) comprise or are exclusively formed by a mixture of copper(I) iodide, and potassium iodide; and/or
   wherein the heat stabilizers of component (D) comprise or are exclusively formed by a mixture of pentaerythritol tetrakis(3-(3,5-di-tert-butyl-4-hydroxyphenyl)propionate) and tetrakismethylene(3,5-di-t-butyl-4-hydroxyhydrocinnamato)methane; and/or
   wherein the heat stabilizers of component (D) comprise systems or consist of systems selected from the group consisting of: copper(I) iodide, potassium iodide, lanthanum acetate, lanthanum hydroxide, lanthanum oxide, cerium acetate, cerium tetrahydroxide, cerium oxide, and mixtures thereof.

6. The moulding composition according to claim 1, wherein the fraction of component (E) in the total moulding composition is in the range of 0-4.0 wt %; and/or
   wherein the additives of component (E) comprise systems selected from the following group or consist of these systems: crystallization accelerators or retardants, flow aids, lubricants, demoulding agents, pigments, dye and marking substances, processing aids, antistatic agents, carbon nanotubes, residues from polymerization processes, antioxidants, antiozonants, light stabilizers, UV stabilizers, UV absorbers or UV blockers, IR absorbers, NIR absorbers, antiblocking agents, nucleating agents, chain transfer agents, defoamers, chain-extending additives, conductivity additives, release agents, organic pigments, carbon black, graphite, graphene, photochromic agents, demoulding agents, optical brighteners, and also mixtures and combinations thereof.

7. The moulding composition according to claim 1, wherein the moulding composition has a melt strength in the range of 30-70 seconds; and/or
   wherein the moulding composition has a tensile elasticity modulus of at most 800 MPa measured according to ISO 527 (2012), dry state; and/or wherein the moulding composition exhibits no delamination under dynamic-mechanical stressing after at least 1.3 million cycles with alternating compressive and tensile loading at 150° C.

8. A process for producing a moulding composition according to claim 1, wherein components (A)-(E) in unison in melted or unmolten form are metered into a mixing apparatus.

9. The process for producing according to claim 8, wherein components (A)-(E) in unison in melted form are metered into a mixing apparatus, in the form of an extrusion apparatus having one, two or more screws.

10. A method of using a moulding composition according to claim 1 comprising, applying the molding composition in a blow moulding process an injection moulding process, an extrusion process or a coextrusion process.

11. The method of use according to claim 10, comprising use in a blow moulding process, selected from an extrusion blow moulding process, a stretch blow moulding process, 3D blow moulding, coextrusion blow moulding, coextrusion 3D blow moulding, sequential coextrusion, coextrusion suction blow moulding, or sequential blow moulding.

12. A moulding made from a moulding composition according to claim 1.

13. The moulding composition according to claim 1, wherein the fraction of component (A) in the total moulding composition is in the range of 53-64.6 wt %.

14. The moulding composition according to claim 1, wherein the fraction of component (A) in the total moulding composition is in the range of 56-63.5 wt %.

15. The moulding composition according to claim 1, wherein the hard segments of the polyamide elastomer of component (A) are formed exclusively by PA6; and/or wherein the polyamide elastomer of component (A) or the mixture of polyamide elastomers of component (A) has a melting point, measured according to ISO 11357-3 (2013) at a heating rate of 20° C./min, in the range of 200-220° C., and/or a relative viscosity, measured according to ISO 307 (2013) at a concentration of 0.5 g of polymer in 100 ml of m-cresol and a temperature of 20° C., in the range from 1.50-2.20; and/or wherein the number-average molar mass of the soft segments, in the form of polyetherdiols and/or polyetherdiamines, is 200 to 5000 g/mol.

16. The moulding composition according to claim 1, wherein the number-average molar mass of the soft segments, is 400 to 3000 g/mol.

17. The moulding composition according to claim 1, wherein the fraction of the soft segments in the polyetheresteramide and/or polyetheramide is 5 to 60 wt %.

18. The moulding composition according to claim 1, wherein the fraction of the soft segments in the polyetheresteramide and/or polyetheramide is 20 to 50 wt %.

19. The moulding composition according to claim 1, wherein the fraction of component (B) in the total moulding composition is in the range of 20-33 wt %.

20. The moulding composition according to claim 1, wherein the fraction of component (B) in the total moulding composition is in the range of 2533 wt %.

21. The moulding composition according to claim 1, wherein the degree of grafting of the ethylene-α-olefin copolymer of component (B) is in the range of 1.0-1.4 wt %; and/or the ethylene-a-olefin copolymer of component (B) or the mixture of the ethylene-α-olefin copolymers of component (B) has a melting point in the range of 60-70° C., and/or a glass transition point of less than −30° C., and/or a melt flow index (MFR) in the range of 1.0-1.5 g/10 min at 230° C. and 2.16 kg as measured according to ASTM D 1238.

22. The moulding composition according to claim 1, wherein the fraction of component (C) in the total moulding composition is in the range of 7-18 wt %.

23. The moulding composition according to claim 1, wherein the fraction of component (C) in the total moulding composition is in the range of 8-15 wt %.

24. The moulding composition according to claim 1, wherein the polyamide of component (C) is selected from the group consisting of: PA6, PA66, and PA6/66;
and/or in that the polyamide of component (C) has a relative viscosity of 3.6-4.0 measured according to ISO 307 (2013), sulfuric acid, 1.0 wt %, 20° C.;
and/or in that the polyamide of component (C) consists exclusively of PA6, where this PA6 has a relative viscosity of 3.5-4.1 measured according to ISO 307 (2013), sulfuric acid, 1.0 wt %, 20° C.

25. The moulding composition according to claim 1, wherein the fraction of component (D) in the total moulding composition is in the range 0.3-2.0 wt %.

26. The moulding composition according to claim 1, wherein the fraction of component (D) in the total moulding composition is in the range of 0.3-1.5 wt %.

27. The moulding composition according to claim 1,
wherein the heat stabilizers of component (D) comprise systems or consist of systems selected from the group consisting of: copper(I) iodide, potassium iodide, organic stabilizers, and a mixture thereof, where the organic stabilizers are selected from the group consisting of: pentaerythritol tetrakis(3-(3,5-di-tert-butyl-4-hydroxyphenyl)propionate), tetrakismethylene(3,5-di-t-butyl-4-hydroxyhydrocinnamato)methane and a mixture of these systems;
and/or in that the heat stabilizers of component (D) comprise or are exclusively formed by a mixture of copper(I) iodide, and potassium iodide, where the fraction of copper(I) iodide is in the range of 0.02-0.1 wt % and the fraction of potassium iodide is in the range of 0.2-0.6 wt %, based in each case on the total moulding composition; and/or
wherein the heat stabilizers of component (D) comprise or are exclusively formed by a mixture of pentaerythritol tetrakis(3-(3,5-di-tert-butyl-4-hydroxyphenyl)propionate) and tetrakismethylene(3,5-di-t-butyl-4-hydroxyhydrocinnamato)methane, in a weight ratio of 1:1- 3:1.

28. The moulding composition according to claim 1,
wherein the fraction of component (E) in the total moulding composition is in the range of 0.1-3.0 wt %; and/or
wherein the additives of component (E) comprise systems selected from the following group or consist of these systems: crystallization accelerators or retardants, flow aids, lubricants, demoulding agents, pigments, dye and marking substances, processing aids, antistats, carbon nanotubes, residues from polymerization processes in the form of catalysts, salts and derivatives thereof, antioxidants, antiozonants, light stabilizers, UV stabilizers, UV absorbers or UV blockers, IR absorbers, NIR absorbers, antiblocking agents, nucleating agents, chain transfer agents, defoamers, chain-extending additives, conductivity additives, release agents, organic pigments, carbon black, graphite, graphene, photochromic agents, demoulding agents, optical brighteners, and also mixtures and combinations thereof.

29. The moulding composition according to claim 1, wherein the additives of component (E) comprise systems selected from the following group or consisting of: demoulding aids, light stabilizers, pigments, dyes, and chain extenders.

30. The moulding composition according to claim 1, wherein the sum of (B) and (C) is in the range of 35-42 wt %.

31. The moulding composition according to claim 1, wherein the sum of (B) and (C) is in the range of 36-41 wt %.

32. The moulding composition according to claim 1, wherein the moulding composition has a melt strength in the range of 35-60 seconds or in the range of 40- 55 seconds;
and/or in that the moulding composition has a tensile elasticity modulus of 100-700 MPa measured according to ISO 527 (2012), dry state.

33. The moulding composition according to claim 1,
wherein the fraction of component (E) in the total moulding composition is in the range of 0.2-2.5 wt %.

34. The moulding composition according to claim 1, wherein the additives of component (E) comprise systems selected from the following group or consist of these systems: acrylic acid-modified polyolefins with a degree of grafting of more than 4 wt % and/or combination of a polycarbonate with an acid-terminated polyamide.

35. The moulding composition according to claim 1, wherein the additives of component (E) comprise a polyethylene grafted with acrylic acid, with a degree of grafting in the range of 5-7 wt %, based on the grafted polyethylene.

* * * * *